(12) United States Patent
Iwata et al.

(10) Patent No.: US 8,953,931 B2
(45) Date of Patent: Feb. 10, 2015

(54) VIDEO PROCESSOR, VIDEO PROCESSING METHOD, INTEGRATED CIRCUIT FOR VIDEO PROCESSING, VIDEO PLAYBACK DEVICE

(75) Inventors: Yoshiaki Iwata, Osaka (JP); Norihiro Matsui, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 802 days.

(21) Appl. No.: 12/999,444

(22) PCT Filed: Mar. 26, 2010

(86) PCT No.: PCT/JP2010/002180
§ 371 (c)(1),
(2), (4) Date: Dec. 16, 2010

(87) PCT Pub. No.: WO2010/109900
PCT Pub. Date: Sep. 30, 2010

(65) Prior Publication Data
US 2011/0081132 A1    Apr. 7, 2011

(30) Foreign Application Priority Data
Mar. 26, 2009    (JP) ................................. 2009-075537

(51) Int. Cl.
*H04N 5/93*    (2006.01)
*H04N 7/16*    (2011.01)
(Continued)

(52) U.S. Cl.
CPC ............... *H04N 7/163* (2013.01); *H40N 5/144* (2013.01); *H04N 5/23248* (2013.01); *H04N 5/58* (2013.01);

(58) Field of Classification Search
None
See application file for complete search history.

(56) References Cited

U.S. PATENT DOCUMENTS 6,392,689 B1 *  5/2002  Dolgoff .......................... 348/44
2003/0099467 A1  5/2003  Inoue et al.
(Continued)

FOREIGN PATENT DOCUMENTS

JP    7-143338    6/1995
JP    7-143380    6/1995
(Continued)

OTHER PUBLICATIONS

Japanese Office Action issued May 14, 2013 in corresponding Japanese Patent Application No. 2011-505886.
(Continued)

*Primary Examiner* — Heather Jones
(74) *Attorney, Agent, or Firm* — Wenderoth, Lind & Ponack, L.L.P.

(57) ABSTRACT

A video processing apparatus acquires audio-visual environment information that indicates an audio-visual environment of a viewer that views video. The audio-visual environment information includes information of a display size of the video that is being viewed, information of brightness around a display apparatus that displays the video, and information of a distance between the viewer and the display apparatus. The video processing apparatus corrects, depending on information indicated by the audio-visual environment information, a basic reduction amount to reduce a quantity of motion of the video that is being played back, and processes the video with use of a corrected reduction amount. In the case where the display size is large, in the case where it is dark around, or in the case where the distance from the viewer to the display apparatus is short, the reduction amount to reduce a motion is set to be large.

17 Claims, 11 Drawing Sheets

(51) Int. Cl.
 *H04N 5/232* (2006.01)
 *H04N 5/58* (2006.01)
 *H04N 7/01* (2006.01)
 *H04N 9/877* (2006.01)
 *H04N 21/41* (2011.01)
 *H04N 21/422* (2011.01)
 *H04N 21/432* (2011.01)
 *H04N 21/4402* (2011.01)
 *G11B 20/10* (2006.01)

(52) U.S. Cl.
 CPC .............. *H04N 7/0132* (2013.01); *H04N 9/877* (2013.01); *H04N 21/4122* (2013.01); *H04N 21/42202* (2013.01); *H04N 21/4325* (2013.01); *H04N 21/4402* (2013.01); *G11B 2020/10537* (2013.01); *G11B 2220/2541* (2013.01); *G11B 2220/2562* (2013.01)
 USPC .......................................................... 386/353

(56) References Cited

U.S. PATENT DOCUMENTS

2007/0292113 A1* 12/2007 Tsou et al. ..................... 386/95
2010/0002132 A1* 1/2010 Kobayashi ................... 348/452
2010/0073471 A1* 3/2010 Mochiduki ..................... 348/77

FOREIGN PATENT DOCUMENTS

| | | |
|---|---|---|
| JP | 3166462 | 3/2001 |
| JP | 3587308 | 8/2004 |
| JP | 2008-48035 | 2/2008 |
| JP | 2008-153776 | 7/2008 |
| JP | 2008-299241 | 12/2008 |

OTHER PUBLICATIONS

International Search Report issued Apr. 20, 2010 in International (PCT) Application No. PCT/JP2010/002180.

\* cited by examiner

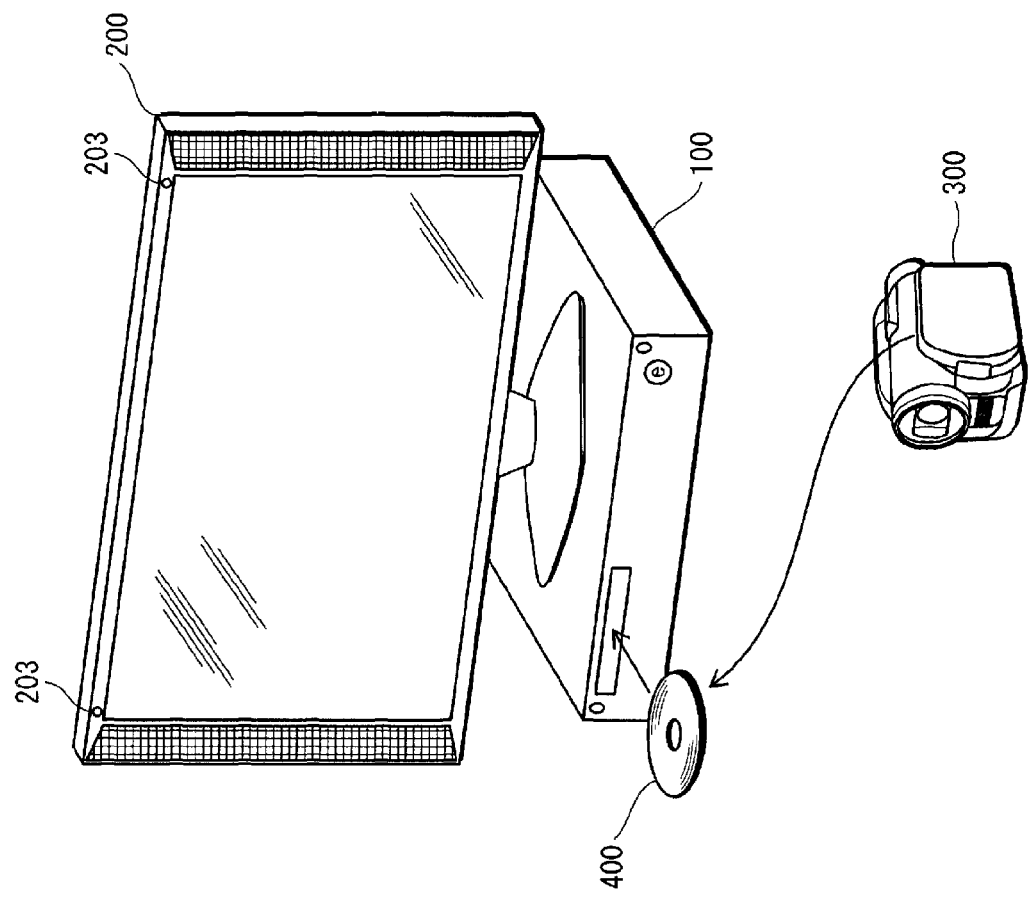
FIG. 1
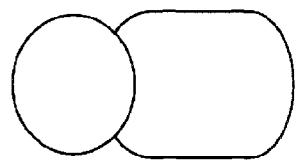

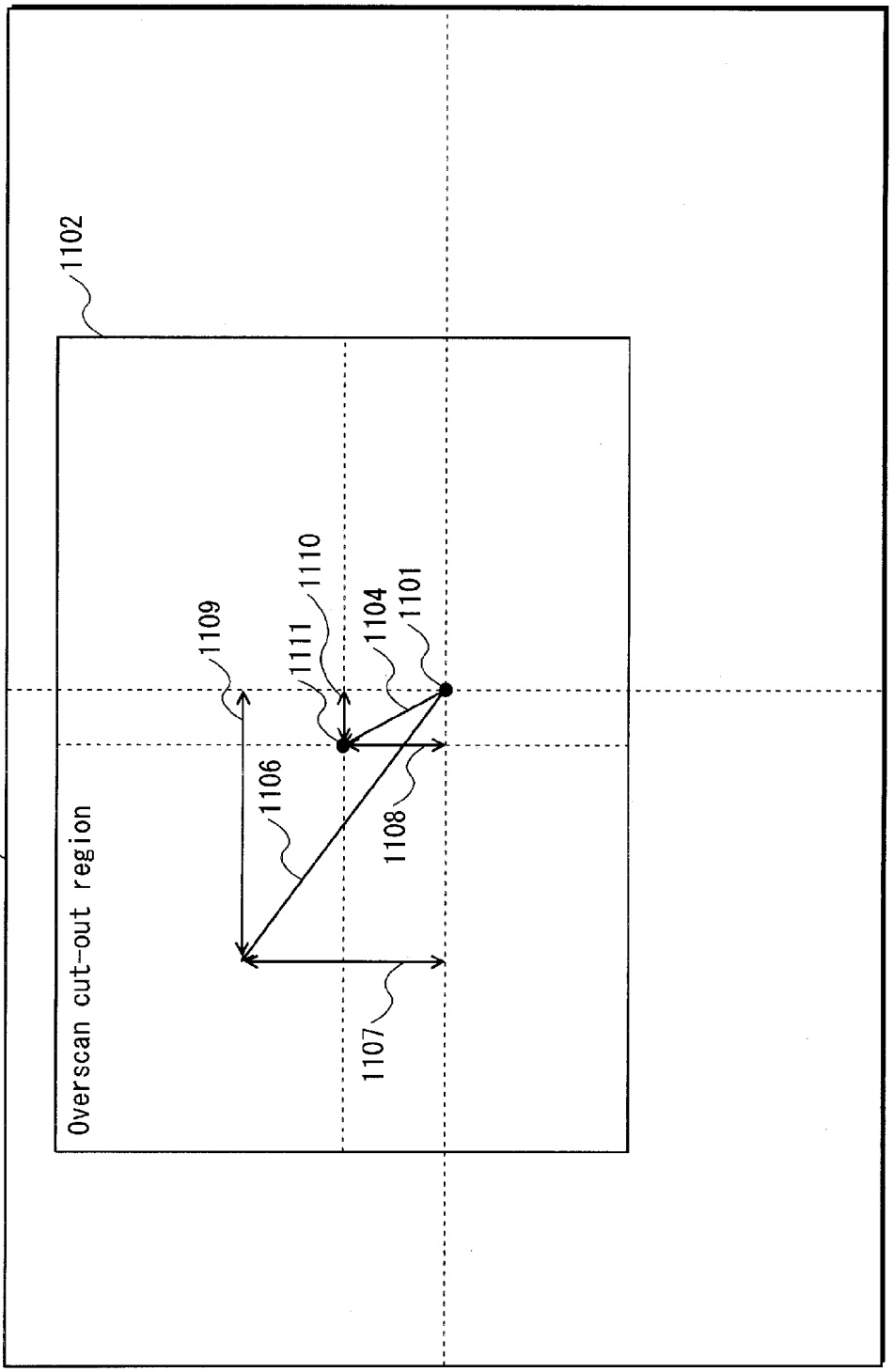

VIDEO PROCESSOR, VIDEO PROCESSING METHOD, INTEGRATED CIRCUIT FOR VIDEO PROCESSING, VIDEO PLAYBACK DEVICE

TECHNICAL FIELD

The present invention relates to a video processing apparatus, a video playback apparatus, and in particular to a technique for preventing visually induced motion sickness that occurs while a susceptible viewer is watching video.

BACKGROUND ART

In recent years, due to progress in technologies such as a small-sized, densely-packed component or the like, an imaging apparatus such as a movie camera has reduced in size and weight. At the same time, a high magnification lens mounted on such a camera enables to shoot more precise images.

However, a small-sized apparatus having such a high magnification lens is likely to cause blurring during shooting video.

Therefore, a digital camera and a movie camera having a function for reducing such blurring have been popular, and there are various kinds of functions for image stabilization.

For example, image-stabilizing system by using full digital processing detects a motion between images that are output with use of a CCD (Charge Coupled Device). The system outputs an image stored in a feed memory by moderating a motion vector of the detected motion in a horizontal range and a vertical range.

Also, a lens shift-type image stabilizer includes plural lenses in its lens barrel. The plural lenses include a correction lens in a form of an inertia pendulum which also has a biaxial operation mechanism. The use of such a correction lens eliminates blurring generated by a hand motion.

In addition, an image stabilization function with a large-area image sensor uses an image sensor that is larger than a normal effective display range (display size). The image stabilization function detects a motion with use of an acceleration sensor or the like and controls a read-out start position of pixels whose size are equivalent to the display size in the image sensor, based on a signal output by the acceleration sensor.

Also, there is a method for correcting blurring not on an imaging apparatus but on a playback apparatus. An image-stabilizing by using digital processing function on the playback apparatus detects a motion from a playback image of video output. After a read-out position of the image is determined in accordance with a motion vector of the image, the image-stabilizing by using digital processing function reads and controls a read-out start position of the image that has been accumulated in a feed memory.

Patent Literature 1 discloses a method of image-stabilizing by using digital processing on the playback apparatus. Blurring is appropriately suppressed in accordance with an overscan amount of a television to which a playback apparatus is connected.

CITATION LIST

Patent Literature

[Patent Literature 1]
Japanese Patent Application Publication No. H7-143338

SUMMARY OF INVENTION

Technical Problem

In recent years, due to a spread of large-sized television sets at a low price, opportunities to view video on a large screen are increasing, compared to the past. In such a case, unfortunately, the video viewed on the large screen are likely to cause a symptom that is so called "visually induced motion sickness" to viewers.

A configuration described in the above-mentioned Patent Literature 1 can minimize a degree of image deterioration that is caused by blurring, depending on an overscan amount. That is, while the configuration of the Patent Literature 1 can output highly accurate images, it is impossible to prevent visually induced motion sickness suffered by viewers.

The present invention has been achieved in view of the above problem, and an aim thereof is to provide a video processing apparatus and a video playback apparatus, each of which can reduce visually induced motion sickness suffered by viewers.

Solution to Problem

In order to solve the above problems, a video processing apparatus that processes a video and outputs the processed video for playback, the video processing apparatus comprises: a motion information acquisition unit operable to acquire motion information related to a motion between two or more frames constituting the video; an audio-visual environment information acquisition unit operable to acquire audio-visual environment information indicating an audio-visual environment of a viewer that views the processed video; a reduction amount output unit operable to output, based on the audio-visual environment information acquired by the audio-visual environment information acquisition unit, a reduction amount for reducing a quantity of motion that is determined by the motion information acquired by the motion information acquisition unit; and a processing unit operable to process the video using the reduction amount output by the reduction amount output unit.

Also, A video processing method that processes a video played back by a video playback apparatus, the video processing method comprises a step of: acquiring motion information related to a motion between two or more frames constituting the video; acquiring audio-visual environment information indicating an audio-visual environment of a viewer that views the processed video; outputting, based on the audio-visual environment information acquired by the audio-visual environment information acquisition unit, a reduction amount for reducing a quantity of motion that is determined by the motion information acquired by the motion information acquisition unit; and processing the video using the reduction amount output by the reduction amount output unit.

Also, A video processing integrated circuit that processes a video and outputs the processed video for playback, the video processing integrated circuit comprises: a motion information acquisition unit operable to acquire motion information related to a motion between two or more frames constituting the video; an audio-visual environment information acquisition unit operable to acquire audio-visual environment information indicating an audio-visual environment of a viewer that views the processed video; a reduction amount output unit operable to output, based on the audio-visual environment information acquired by the audio-visual environment information acquisition unit, a reduction amount for reducing a quantity of motion that is determined by the motion information acquired by the motion information acquisition unit; and a processing unit operable to process the video using the reduction amount output by the reduction amount output unit.

Also, A video playback apparatus that processes a video and outputs the processed video for playback, the video playback apparatus comprises: a motion information acquisition unit operable to acquire motion information related to a motion between two or more frames constituting the video; an audio-visual environment information acquisition unit operable to acquire audio-visual environment information indicating an audio-visual environment of a viewer that views the processed video; a reduction amount output unit operable to output, based on the audio-visual environment information acquired by the audio-visual environment information acquisition unit, a reduction amount for reducing a quantity of motion that is determined by the motion information acquired by the motion information acquisition unit; and a processing unit operable to process the video using the reduction amount output by the reduction amount output unit.

Advantageous Effects of Invention

According to the above configuration, it is possible to process the video depending on the audio-visual environment of the viewer that views the processed video, and it is therefore possible to prevent a visually induced motion sickness of the viewer.

Also, the reduction amount output unit may output, as the reduction amount, an adjusted reduction amount that is obtained by adjusting a predetermined basic reduction amount using a correction amount that is determined based on the audio-visual environment information.

By determining the basic reduction amount, a correction depending on the basic reduction amount is possible. Therefore, for example, by changing the basic reduction amount depending on likelihood of motion sickness of the viewer, it is possible to determine a reduction amount depending on the likelihood of motion sickness of the viewer.

Also, the audio-visual environment information may include size information indicating a size of a video display area of a display apparatus that is to play back the processed video, and the reduction amount output unit may adjust the basic reduction amount based on the size information.

Also, the reduction amount output unit may perform the adjustment by increasing the basic reduction amount in proportion to the size of the video display area indicated by the size information.

Accordingly, the video processing apparatus can perform a correction depending on the display size of the video. As the display size of the video grows larger, the viewer is more likely to suffer from visually induced motion sickness. Therefore, such a correction can prevent visually induced motion sickness of the viewer.

Also, when the size of the video display area indicated by the size information is larger than a predetermined size, the reduction amount output unit may perform the adjustment by increasing the basic reduction amount.

When the display size of the video exceeds the predetermined size, visually induced motion sickness is specifically likely to occur. Therefore, with use of a simple judgment mechanism that judges whether the display size of the video exceeds a predetermined threshold value, the video processing unit can perform a correction depending on the display size of the video.

Also, the reduction amount output unit may perform the adjustment such that as the size of the video display area indicated by the size information grows larger, a vertical component of a vector that defines the quantity of motion increases at a greater ratio than a horizontal component of the vector.

Accordingly, as the display size of the video grows larger, a horizontal correction amount of the vector that defines the quantity of motion can be increased at a greater ratio than a vertical correction amount of the vector. Since a motion in a vertical direction more greatly involves visually induced motion sickness than a motion in a horizontal direction does, such an adjustment can respond to such an involvement.

Also, the audio-visual environment information may include brightness information indicate indicating brightness around a display apparatus that is to play back the processed video, and the reduction amount output unit may adjust the basic reduction amount based on the brightness information.

Also, the reduction amount output unit may perform the adjustment by increasing the basic reduction amount in inverse proportion to the brightness indicated by the brightness information.

Accordingly, the video processing apparatus can perform a correction depending on the brightness around. As it grows darker, the viewer is more likely to suffer from visually induced motion sickness. Therefore, such an adjustment can prevent motion sickness of the viewer.

Also, when the brightness indicated by the brightness information is lower than brightness indicated by a predetermined threshold value, the reduction amount output unit may perform the adjustment by increasing the basic reduction amount.

When the brightness becomes lower than the predetermined brightness, motion sickness is specifically likely to occur. Therefore, with use of a simple judgment mechanism that judges whether the brightness around the display apparatus exceeds the predetermined threshold value, the video processing unit can perform a correction depending on the brightness.

Also, the reduction amount output unit may perform the adjustment, regarding a horizontal component and a vertical component of a vector that defines the quantity of motion, such that the reduction amount of the vertical component is larger than the reduction amount of the horizontal component.

Accordingly, as it grows darker, the horizontal correction amount of the vector that defines the quantity of motion can be increased at a greater ratio than the vertical correction amount of the vector. Since the motion in the vertical direction more greatly involves motion sickness than the motion in the horizontal direction does, such an adjustment can respond to such an involvement.

Also, the audio-visual environment information may include viewer position information indicating a distance between the viewer that views the processed video and a display apparatus that is to play back the processed video, and the reduction amount output unit may perform the adjustment based on the viewer position information.

Also, the reduction amount output unit may perform the adjustment by increasing the basic reduction amount in inverse proportion to the distance indicated by the viewer position information.

Accordingly, the video processing apparatus can perform a correction depending on a viewer position. As the distance between the viewer and the display apparatus that is to display the video grows shorter, motion sickness is more likely to occur. Therefore, such an adjustment can prevent motion sickness of the viewer.

Also, when the distance indicated by the viewer position information is shorter than a distance indicated by a predetermined threshold value, the reduction amount output unit may perform the adjustment by increasing the basic reduction amount.

When the distance between the viewer and the display apparatus is shorter than the predetermined distance, motion sickness is specifically likely to occur. Therefore, with use of a simple judgment mechanism that judges whether the distance between the viewer and the display apparatus exceeds the predetermined threshold value, the video processing unit can perform a correction depending on the distance between the viewer and the display apparatus.

Also, the reduction amount output unit may perform the adjustment such that as the distance indicated by the viewer position information grows shorter, the reduction amount of a vertical component of a vector that defines the quantity of motion increases at a greater ratio than the reduction amount of a horizontal component of the vector.

Accordingly, as the distance grows shorter, the horizontal correction amount of the vector that defines the quantity of motion can be increased at a greater ratio than the vertical correction amount of the vector. Since the motion in the vertical direction more greatly involves motion sickness than the motion in the horizontal direction does, such an adjustment can respond to such an involvement.

Also, the basic reduction amount may be composed of a vertical basic reduction amount and a horizontal basic reduction amount, and the vertical basic reduction amount may be larger than the horizontal basic reduction amount.

Accordingly, the vertical component of the vector can be reduced more than the horizontal component of the vector. As a result, motion sickness becomes less likely to occur. This is because blurring in the vertical direction is more likely to cause motion sickness than blurring in the horizontal direction.

Also, the video processing apparatus may further comprises: an output unit operable to, when the video that is stored in a recording medium is overscanned, cut out and output a cut-out region determined based on the quantity of motion that is reduced in accordance with the adjusted reduction amount.

Accordingly, the video processing apparatus corrects the reduction amount, and outputs video data that has been cut out in accordance with the overscan cut-out region based on the quantity of motion determined by a corrected reduction amount. Therefore, the viewer that views the video data is less likely to suffer from motion sickness.

BRIEF DESCRIPTION OF DRAWINGS

FIG. 1 is a system diagram showing a usage pattern of a playback apparatus.

FIG. 11 is an explanation showing a processing example of a quantity of motion.

DESCRIPTION OF EMBODIMENTS

The following describes a video processing apparatus according to an embodiment of the present invention and a playback apparatus on which the video processing apparatus is mounted with reference to the drawings.

FIG. 1 is a system diagram showing a usage pattern of a playback apparatus 100.

The playback apparatus 100 is typified by a BD (Blu-ray Disc) player or a DVD (Digital Versatile Disc) player, for example. The playback apparatus 100 plays back a video stored on a recording medium such as a BD-ROM or a DVD-ROM, and a video received via the broadcast wave. The video playback apparatus 100 is connected to a display apparatus 200 and an imaging apparatus 300 via an HDMI cable or the like.

The display apparatus 200 is, for example, typified by a digital television. Also, the imaging apparatus 300 is, for example, a digital movie camera. Video shot by the imaging apparatus 300 are stored in a recording medium disc 400. The recording medium disc 400 is inserted into a drive of the playback apparatus 100 so as to be played back.

The playback apparatus 100 corrects a motion of video indicated by a piece of video data read from the recording medium disc 400, based on audio-visual environment information (display size, brightness or the like) of a viewer acquired by the display apparatus 200. Such video data after correction is output to the display apparatus 200. In this description, the correction will be called blur correction. Blur correction is so called image stabilization in other words.

Figure 2:
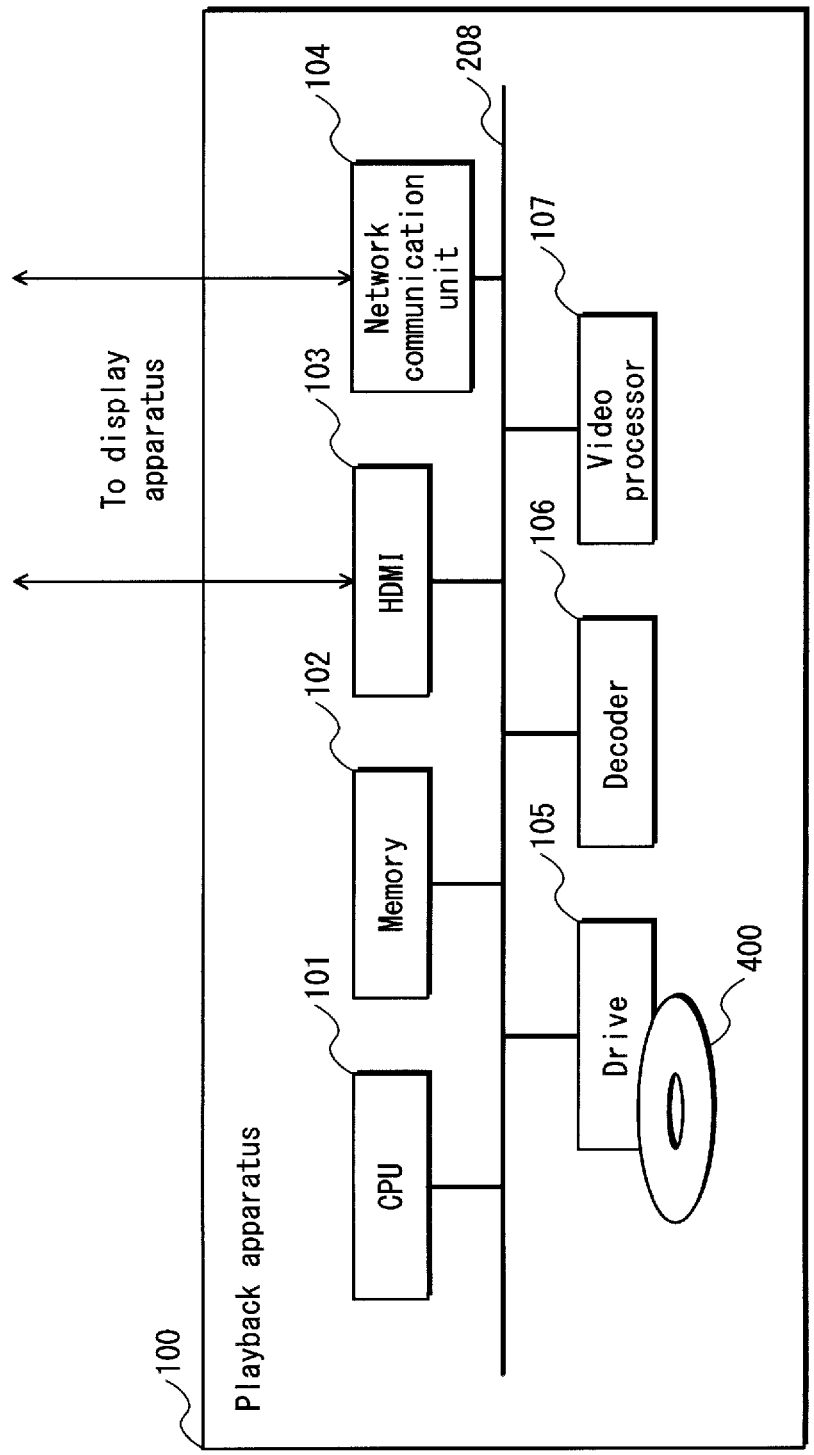
FIG. 2 is a functional block diagram showing a function configuration of the playback apparatus.

FIG. 2 is a functional block diagram showing a function configuration of the playback apparatus 100.

As FIG. 2 shows, the playback apparatus 100 includes a CPU (Central Processing Unit) 101, a memory 102, an HDMI (High-Definition Multimedia Interface) 103, a network communication unit 104, a disc drive 105, a decoder 106 and a video processor 107. The compositional elements of the playback apparatus 100 is connected with one another via an internal bus 108.

The CPU 101 controls each compositional element of the playback apparatus 100. Especially, when a video is played back, the CPU 101 determines a reduction amount for reducing a quantity of motion between frames of a video for playback. The CPU 101 acquires, from the display apparatus 200, audio-visual environment information indicating audio-visual environments (display size of the video for playback, ambient brightness and distance from a display to a viewer) of a viewer. The audio-visual environments may be called viewing environments. The CPU 101 then obtains, based on the acquired audio-visual environment information, a correction amount of the reduction amount with regard to each of audio-visual environments. Each correction amount is adjusted by being added to a basic reduction amount. An adjusted reduction amount is output to the video processor 107 via the internal bus 208.

The memory 102 stores therein various programs and data that are necessary to operate the playback apparatus 100, and includes a ROM (Read Only Memory) and RAM (Random Access Memory). The ROM stores therein various execution programs and data to define operations of the CPU 101. The ROM includes a recording medium and a nonvolatile memory such as a flash ROM that is writable and capable of holding stored contents even when the power is off. The RAM includes a volatile memory incapable of holding stored contents when the power is off.

The HDMI 103 is a connection interface to a HDMI cable. The HDMI 103 transmits/receives data to/from the display apparatus 200 via the HDMI cable. For example, the HDMI 103 outputs a video signal to the display apparatus 200.

The network communication unit 104 is a connection interface to a network communication channel which connects to, via a LAN cable. The network communication unit 104 transmits/receives data to/from the display apparatus 200.

The recording medium disc 400 is inserted in the drive 105. In accordance with an instruction issued by the CPU 101, the drive 105 reads data from the recording medium disc 400, and outputs the read data. Also, the drive 105 writes data that has been output from the CPU 101 into the recording medium disc 400.

The decoder 106 decodes video data that is to be played back, and outputs the decoded video data.

The video processor 107 receives the video data decoded by the decoder 106, and performs a process on the received data to reduce a motion of the video.

Figure 3:
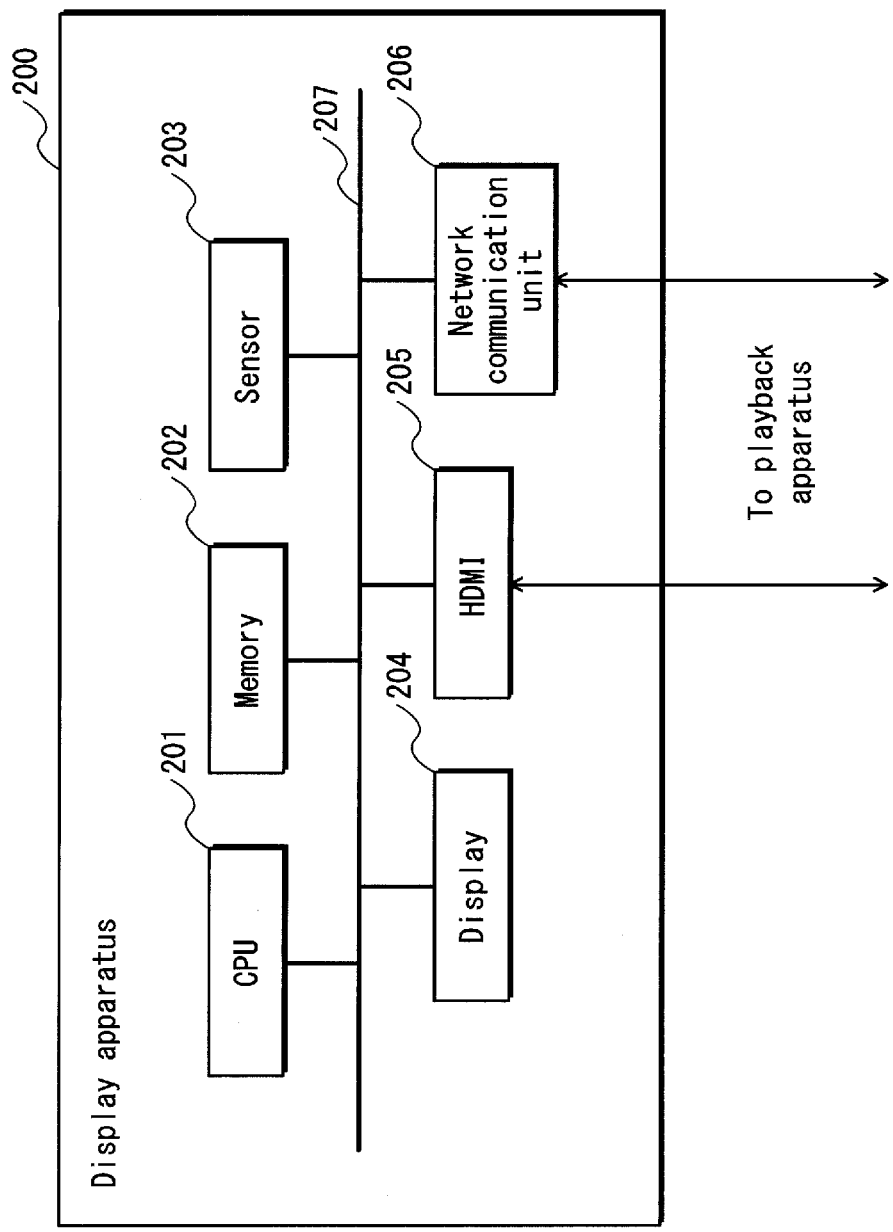
FIG. 3 is a functional block diagram showing a function configuration of a display apparatus.

FIG. 3 is a functional block diagram showing a function configuration of the display apparatus 200.

As FIG. 3 shows, the display apparatus 200 includes a CPU 201, a memory 202, a sensor 203, a display 204, an HDMI 205, and a network communication unit 206. The compositional elements of the display apparatus 200 is connected with one another via an internal bus 207.

The CPU 201 controls each part of the display apparatus 200. In addition, when video is being played back, the CPU 201 obtains a display size of the video with use of a monitor size (information on the display size in inches) and a display mode (full-screen playback, or reduced video playback (in the case where a reduction rate is ½, each of height and width of the display is multiplied by 0.5, in the case where a reduction rate is ¼, each of height and width of the display is multiplied by 0.25, or the like)) of the display apparatus 200. The CPU 201 successively also transmits the obtained display size to the playback apparatus 100 via the HDMI 205 or the network communication unit 206.

The memory 202 stores therein various programs and data that are necessary to operate the display apparatus 200, and includes a ROM and a RAM. The ROM stores therein various execution programs and data to define operations of the CPU 201. The ROM includes a recording medium and a nonvolatile memory such as a flash ROM that is writable and capable of holding stored contents even when the power is off. The RAM includes a volatile memory incapable of holding stored contents when the power is off.

The sensor 203 measures brightness of an audio-visual environment or a viewer position, and includes a brightness sensor, an ultrasonic sensor and the like. According to the present embodiment, the brightness sensor measures brightness around the display apparatus 200, and the ultrasonic sensor measures a distance between the display apparatus 200 and a viewer, with use of ultrasonic reflection. The sensor 203 transmits the measured brightness as brightness information and the distance between the display apparatus 200 and the viewer as viewer position information to the playback apparatus 100 via the HDMI 205 or the network communication unit 206.

The display 204 is an apparatus for displaying video, and is for example a LCD (Liquid Crystal Display).

The HDMI 205 is a connection interface to an HDMI cable. The HDMI 205 receives a video signal from the playback apparatus 100.

The network communication unit 206 is a connection interface to a network communication channel which connects to, via a LAN cable. The network communication unit 206 transmits/receives data to/from the playback apparatus 100.

Figure 4:
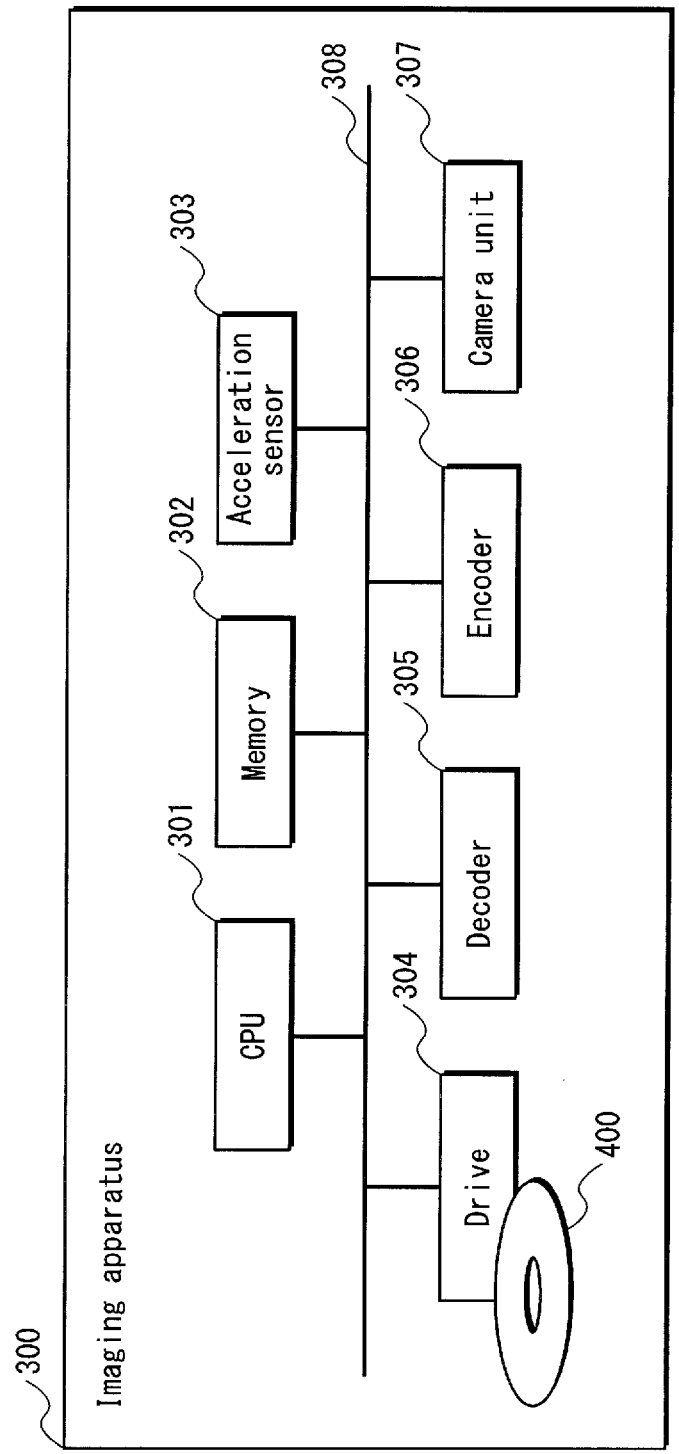
FIG. 4 is a functional block diagram showing a function configuration of an imaging apparatus.

FIG. 4 is a functional block diagram showing a function configuration of the imaging apparatus 300.

As FIG. 4 shows, the imaging apparatus includes a CPU 301, a memory 302, an acceleration sensor 303, a drive 304, a decoder 305, an encoder 306 and a camera unit 307. The compositional elements of the imaging apparatus 300 is connected with one another via an internal bus 308.

The CPU 301 controls each element of the imaging apparatus 300.

The memory 302 stores therein various programs and data that are needed to operate the imaging apparatus 300, and includes a ROM and a RAM. The ROM stores therein various execution programs and data to define operations of the CPU 301. Examples of the ROM include a nonvolatile memory or a recording medium such as a flash ROM. Such a memory is writable, and capable of holding stored contents even when the power is off. Examples of the RAM include a volatile memory incapable of holding stored contents when the power is off.

The acceleration sensor 303 measures an acceleration value of a motion of the camera unit 307, and outputs the measured acceleration value to the internal bus 308.

The recording medium disc 400 is inserted in the drive 304. In accordance with an instruction issued by the CPU 101, the drive 304 reads data from the recording medium disc 400, and outputs the read data. Also, the drive 304 writes data that has been output from the CPU 301 into the recording medium disc 400. The video data stored on the recording medium disc 400 has been encoded by the encoder 306.

The decoder 305 decodes video data to be played back, and outputs the decoded video data, when the imaging apparatus plays back the video data stored in the memory 302 or the recording medium disc 400.

The encoder 306 encodes video data stored in the memory 302, and outputs the video data after encoding.

The camera unit 307 includes a lens, a CCD and the like. The camera unit 307 performs an imaging process, and stores imaged video data in the memory 302.

Figure 5:
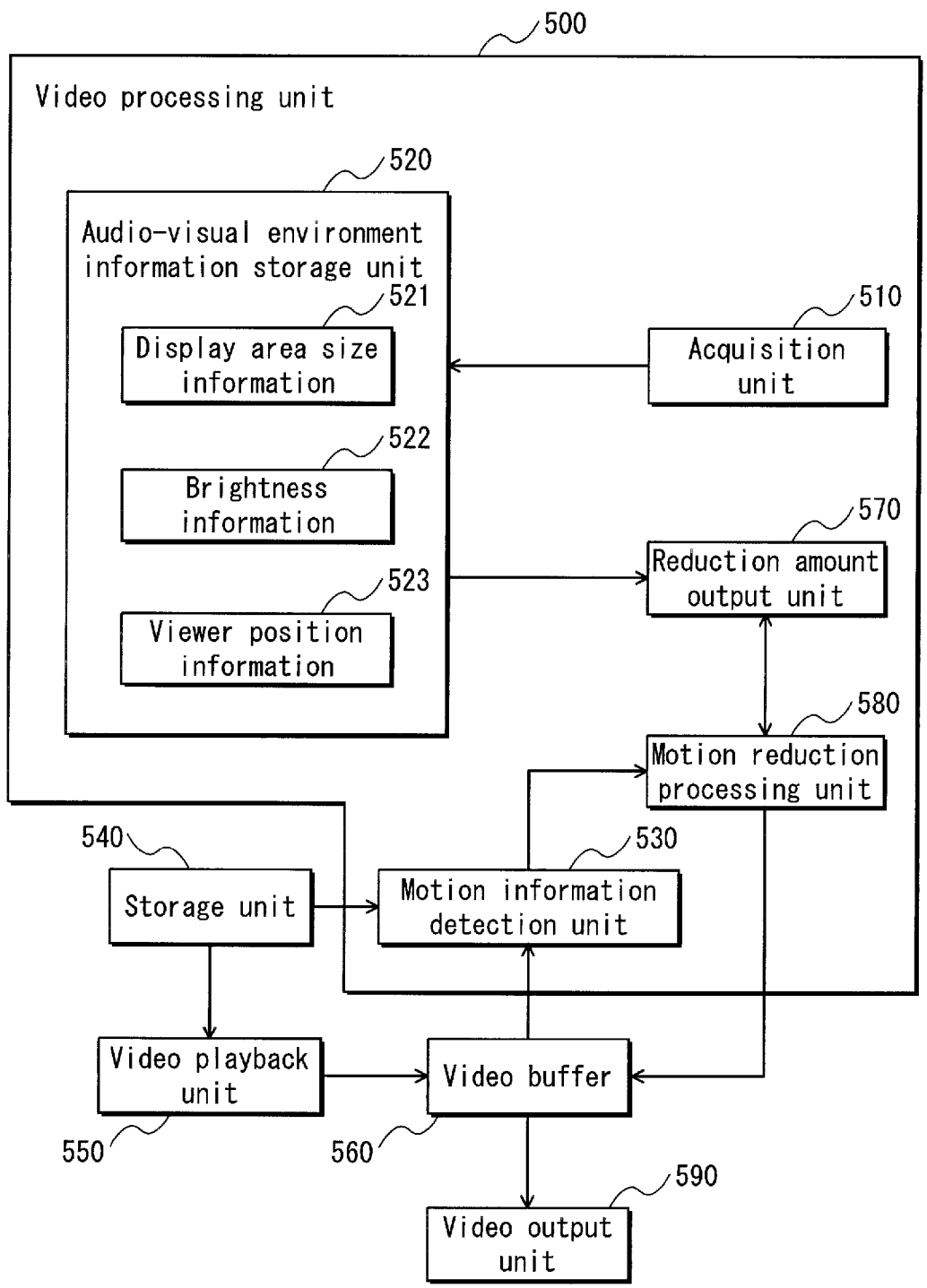
FIG. 5 is a functional block diagram showing a function configuration of the video processing apparatus in the playback apparatus.

FIG. 5 is a functional block diagram showing function sections that perform video processing in the playback apparatus 100.

A video processing unit 500 includes an acquisition unit 510, an audio-visual environment information storage unit 520, a motion information detection unit 530, a reduction amount output unit 570, and a motion reduction processing unit 580. The acquisition unit 510, the motion information detection unit 530 and the reduction amount output unit 570 are realized by a software process performed by the CPU 101. The motion reduction processing unit 580 is realized by the video processor 107.

The acquisition unit 510 successively acquires audio-visual environment information from the display apparatus 200 with use of a CEC (Consumer Electronics Control) function of the HDMI 103 or the network communication unit 104, and stores the acquired audio-visual environment information in the audio-visual environment information storage unit 520.

The audio-visual environment information storage unit 520 stores therein display area size information 521, brightness information 522 and viewer position information 523, as audio-visual environment information used as an indicator of motion sickness of a viewer.

The display area size information 521 includes information of a display size of a video that is displayed on the display apparatus 200, and information of a display position in the case where a video is played back in a reduced display mode. The information of the display size is determined by multiplying the display size of the display apparatus 200 by a playback size of the video (full-screen playback, reduced video playback or the like) (by 1 in the case of full-screen playback, and by multiplying factor according to a reduction size in the case of reduced video playback, for example, by 0.5 in the case of ½ reduction playback). In the case of viewing a high-definition video with hi-vision resolution on a large display, a viewer is likely to suffer from motion sickness. Therefore, the video is corrected with use of the display area size information 521.

The brightness information 522 is acquired by measuring brightness around the display apparatus 200. When a viewer views video in a dark place, the viewer is likely to suffer from motion sickness. Therefore, the video is corrected with use of the brightness information 522.

The viewer position information 523 indicates a distance from a viewer to the display apparatus 200. When the distance from the viewer to a screen that displays a video is short, the viewer is likely to suffer from motion sickness. Therefore, the video is corrected with use of the viewer position information 523.

The motion information detection unit 530 detects a quantity of motion between frames of video data stored in a storage unit 540, and outputs the detected quantity of motion to the motion reduction processing unit 580. The quantity of motion corresponds to a change amount of an overscan cutout region between the frames, with respect to the decoded video data. The overscan cutout region is a region that is cut out due to overscan. Besides, in the case where the recording medium disc 400 has also stored therein blur information while imaging, the blur information corresponds to the quantity of motion. Accordingly, in such a case, the motion information detection unit 530 outputs the blur information as the quantity of motion. Also, in the case where a motion vector in MPEG code is attached to the video data as appendix information, the motion information detection unit 530 outputs the motion vector as the quantity of motion. In addition, in the case where the quantity of motion is detected by analyzing video frame data, the motion information detection unit 530 performs a matching arithmetic operation between a previous field image and a current field image, and detects the quantity of motion within one field by acquiring a difference between those field images.

The reduction amount output unit 570 acquires each piece of audio-visual environment information from the audio-visual environment information storage unit 520. Based on each piece of the audio-visual environment information, the reduction amount output unit 570 determines a correction amount of an adjustment amount of a reduction amount, and notifies the motion reduction processing unit 580 of the correction amount. The reduction amount output unit 570 has stored therein a reference value (also referred to as basic reduction amount) that indicates beforehand how much the quantity of motion is to be reduced, and outputs, to the motion reduction processing unit 580, a correction amount (also referred to as adjustment reduction amount) that is obtained by using the determined correction amount to the basic reduction amount.

The motion reduction processing unit 580 acquires the correction amount of the adjustment amount of the reduction amount from the reduction amount output unit 570. The motion reduction processing unit 580 generates a video whose quantity of motion acquired from the motion information detection unit 530 is adjusted with use of the correction amount, and stores the video in video buffer 560.

The storage unit 540 corresponds to the recording medium disc 400, and stores therein video data to be played back and appendix information. Besides, in some cases, the imaging apparatus 300 has already performed a blur reduction process on the stored video data in the storage unit 540. In such a case, the storage unit 540 may store therein blur information detected in the imaging apparatus 300 and reduced blur information together with corresponding video data. Besides, the appendix information is management information related to the corresponding video data, meta information and the like.

A video playback unit 550 corresponds to the decoder 106. The video playback unit 550 decodes the video data stored in the storage unit 540, and stores the decoded video data in the video buffer 560.

The video buffer 560 corresponds to the memory 102. The video buffer 560 stores therein the video data decoded by the video playback unit 550.

A video output unit 590 acquires the decoded video data or a processed video data that has been processed for reducing a motion throughout the video, and outputs such video data as a video signal. The video output unit 590 is a process performed in the CPU 101, and outputs the video data to the display apparatus 200 via the HDMI terminal.

Figure 6:
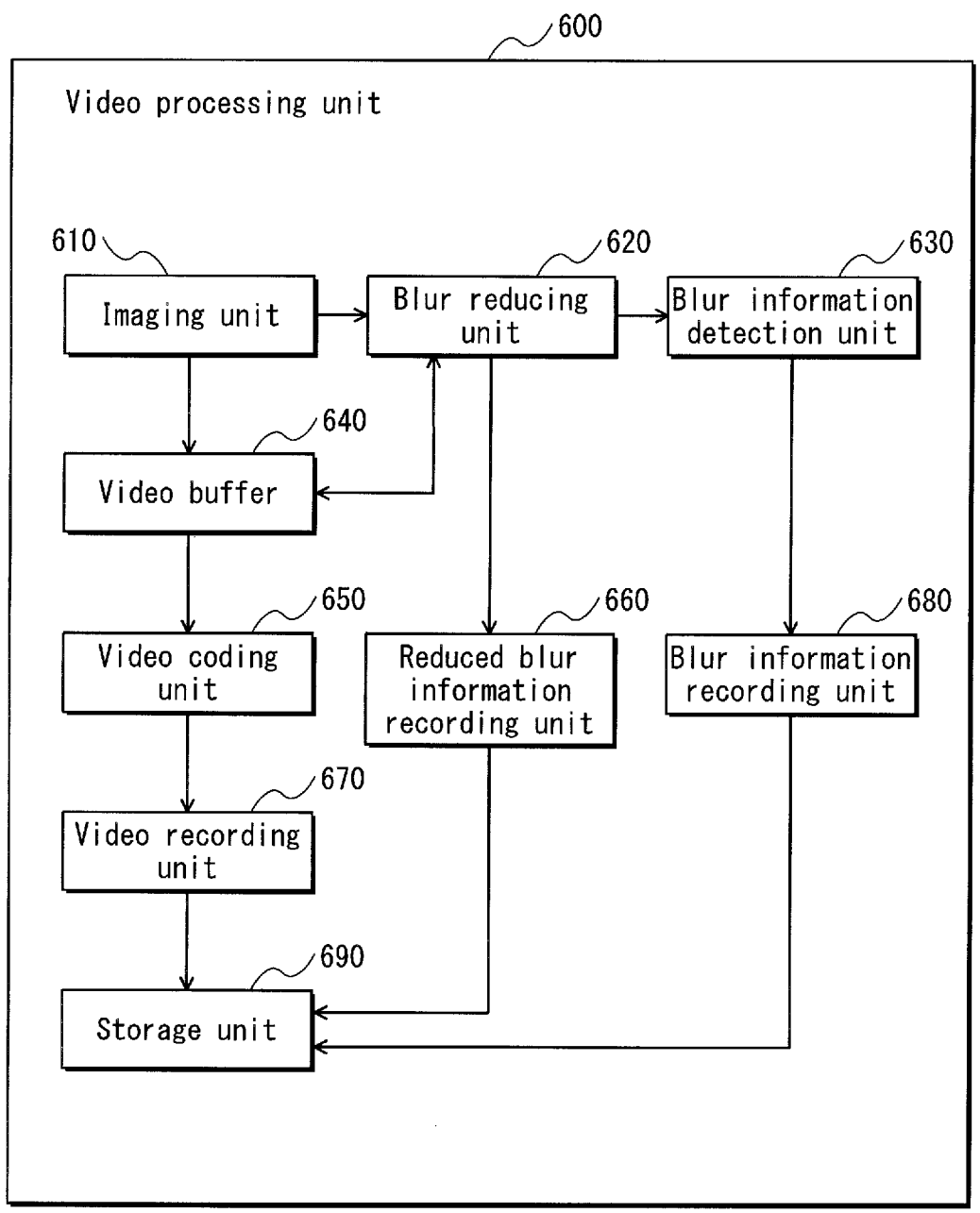
FIG. 6 is a functional block diagram showing a function configuration according to blur correction in the imaging apparatus.

FIG. 6 is a functional block diagram showing a function configuration according to a video processing unit 600 that performs a video processing in the imaging apparatus 300. According to the present embodiment, the video processing unit 600 shown in the figure is realized by a software process by the CPU 301.

As FIG. 6 shows, the video processing unit 600 includes an imaging unit 610, a blur reducing unit 620, a blur information detection unit 630, a video buffer 640, a video coding unit 650, a reduced blur information recording unit 660, a video recording unit 670, a blur information recording unit 680 and a storage unit 690.

The imaging unit 610 corresponds to the camera unit 307. The imaging unit 610 stores an imaged video in the video buffer 640.

The blur information detection unit 630 corresponds to the acceleration sensor 303. The blur information detection unit 630 detects a motion of the video imaged by the imaging unit 610, and notifies the blur reducing unit 620 of a direction and an amount of detected blurring, as blur information.

The blur reducing unit 620 corresponds to a process performed in the CPU 301. The blur reducing unit 620 corrects blurring by adjusting a read position from a CCD of the camera unit 307 or a read/write position of the video buffer, controlling the camera unit 307 or the like. Besides, a basic blur correction technology is a conventional art, and therefore a detailed explanation is omitted.

The image buffer 640 corresponds to the memory 305. The image buffer 640 temporarily stores therein the video data imaged by the imaging unit 610.

The video coding unit 650 corresponds to the encoder 306. The video coding unit 650 encodes the video data stored in the image buffer 640, and outputs the encoded data into the video recording unit 670.

The video recording unit 670 is a process performed in the CPU 301. The video recording unit 670 receives the data encoded by the video coding unit 650, and stores the data in the storage unit 690.

The blur information recording unit 680 is a process performed in the CPU 301. The blur information recording unit 680 receives the blur information detected by the blur information detection unit 630, and stores the blur information in the storage unit 690.

The reduced blur information recording unit 660 is a process performed in the CPU 301. When a blur correction is performed at the time of imaging, the reduced blur information recording unit 660 receives reduced blur information corrected by the blur reducing unit 620, and stores the reduced blur information in the storage unit 690.

The storage unit 690 stores the blur information detected by the blur information detection unit 630 and the blur information reduced by the blur reducing unit 620 in the recording medium disc 400 together with an encoded video. In addition, these pieces of information are stored as a table of time and motion vectors in time series. Besides, regarding the blur information and the reduced blur information, the table of time and motion vectors may be stored in a different file from the video data, or stored so as to be embedded into the video data (for example, into TS packet).

From the configuration above, the imaging apparatus 300 can provide the playback apparatus 100 with the blur information and the reduced blur information at the time of imaging together with the video data, with use of the storage medium disc 400.

<Operation>

Next, the following explains an operation of an imaging apparatus and a video processing apparatus according to the present embodiment with use of flowcharts shown in FIGS. 7-10.

Figure 7:
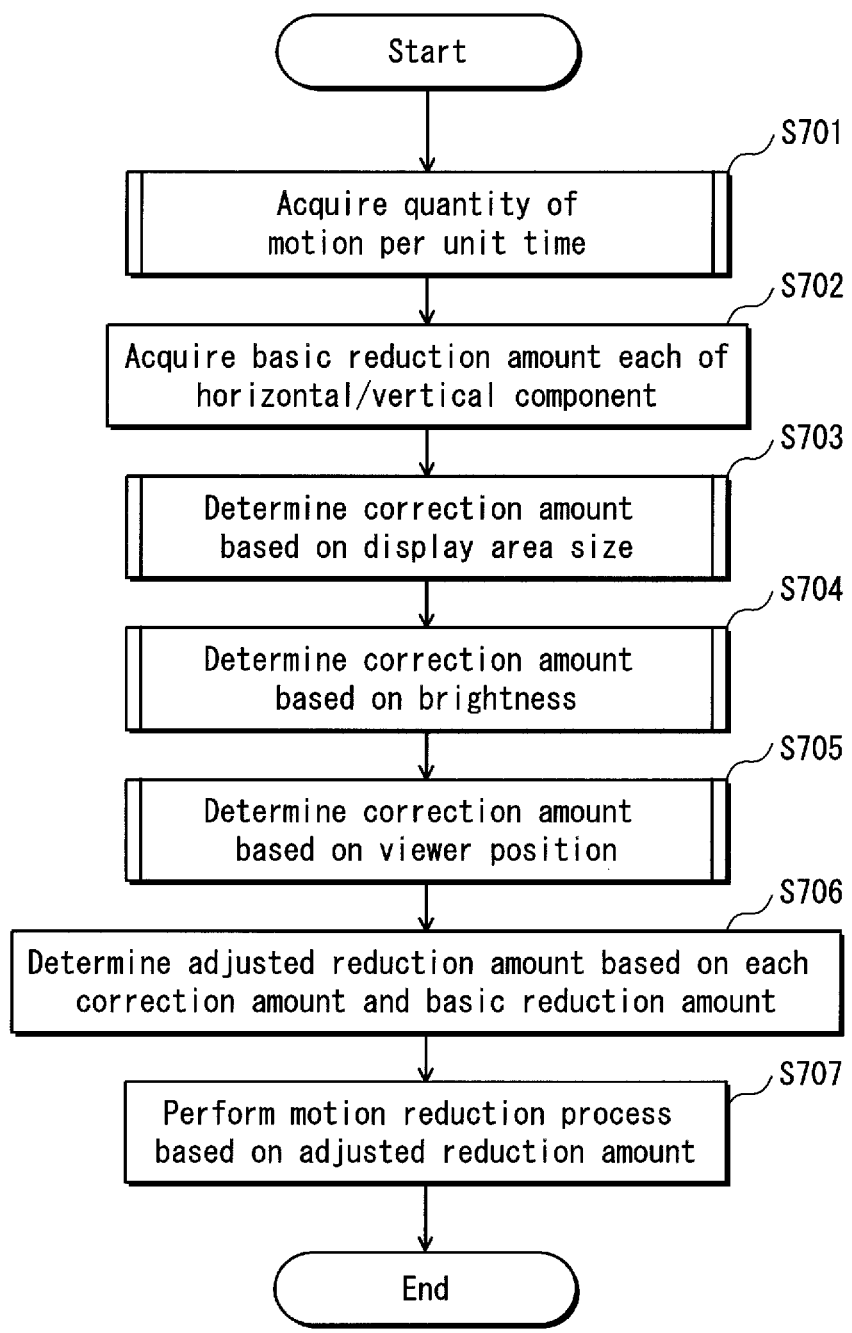
FIG. 7 is a flowchart showing an example of a procedure of motion reduction process.

First, here is an explanation of a whole flow of a video processing per unit time, with use of the flowchart shown in FIG. 7. After that, there will be explanation of a method for determining a correction amount that corrects a reduction amount using each piece of audio-visual environment information is explained, with use of the flowcharts shown in FIGS. 8-10.

FIG. 7 is a flowchart showing the video processing per unit time. By operating the playback apparatus 100 in accordance with the flowchart, the video processing is performed. That is, a quantity of motion is reduced. An operation shown in the flowchart of FIG. 7 is successively performed while a video is played back, and the processing is performed on next video data that is to be played back next to the video that is currently being played back or video data that is to be played back after the next video data.

The video playback unit 550 starts the processing and decodes the video data that is to be played back that is stored in the storage unit 540, and the decoded video data is stored in the video buffer 560. In addition, the acquiring unit 510 successively acquires audio-visual environment information of a viewer from the playback apparatus 200, and the audio-visual environment information storage unit 520 stores therein each piece of audio-visual environment information based on a current audio-visual environment.

The motion information detection unit 530 detects motion information related to a quantity of motion of each frame by analyzing the video data and appendix information of the video data stored in the storage unit 540, or analyzing video frame data developed in the video buffer 560. In the case of analyzing the video data, the motion information detection unit 530 reads motion vector data included in MPEG code. In the case of analyzing the video frame data developed in the video buffer 560, the motion information detection unit 530 performs a matching arithmetic operation between a previous field image and a current field image, and detects a quantity of motion within one field by acquiring a difference between those field images.

Besides, motion sickness is known to occur mainly when an input from three semicircular canals of a human is greatly different from an input from vision. Especially, a motion that is likely to cause motion sickness is relatively a low frequency motion between 0.1 Hz and 3 Hz, and slower than one field (1/60 second). For this reason, it is necessary not only to calculate the above mentioned quantity of motion of each frame but also to measure a quantity of motion throughout 20-120 frames.

The quantity of motion throughout 20-120 frames can be measured by maintaining frame data a predetermined time before (for example, one second before) and detecting a quantity of motion between a video corresponding to the maintained frame data and a video that is to be played back. Also, the quantity of motion may be measured by causing the video buffer 560 to maintain 20-120 frames, or with use of a processing method such as panning detection and tilting detection.

Also, in the case of using the motion vector data in the MPEG code, the quantity of motion may be measured by maintaining not only the motion vector data of each frame but also a sum of motion vectors for a past predetermined time period (for example, one second).

The motion information detection unit 530 included in the playback apparatus 100 acquires the quantity of motion per unit time (for example, per 10 frames) (Step S701).

The reduction amount output unit 570 acquires a basic reduction amount (Step S702). The basic reduction amount is a base of each of a vertical basic reduction amount and a horizontal basic reduction amount. These basic reduction amounts has been stored beforehand in a memory.

Also, the reduction amount output unit 570 acquires the display area size information 521 from the audio-visual environment information storage unit 520. After that, the reduction amount output unit 570 calculates a correction amount for correcting the basic reduction amount that is based on the display area size information 521 (Step S703). A detail of how to calculate the correction amount will be described later with use of the flowchart shown in FIG. 8.

Next, the reduction amount output unit 570 acquires the brightness information 522 from the audio-visual environment information storage unit 520. After that, the reduction amount output unit 570 calculates a correction amount for correcting the basic reduction amount that is based on the brightness information 522 (Step S704). A detail of how to calculate the correction amount will be described later with use of the flowchart shown in FIG. 9.

After that, the reduction amount output unit 570 acquires the viewer position information 523 from the audio-visual environment information storage unit 520. After that, the reduction amount output unit 570 calculates a correction amount for correcting the basic reduction amount that is based on the viewer position information 523 (Step S705). A detail of how to calculate the correction amount will be described later with use of the flowchart shown in FIG. 10.

The reduction amount output unit 570 outputs an adjusted reduction amount to the motion reduction processing unit 580

(Step S706). The adjusted reduction amount is obtained by using the correction amount obtained by adding each of correction amounts acquired from Step S703 to Step S705.

The motion reduction processing unit 580 determines an overscan cutout region that is to be cut out after the processing, based on the adjusted reduction amount. The motion reduction processing unit 580 then transmits the determination regarding the overscan cutout region to the video buffer 560.

The video playback unit 550 decodes the video data stored in the storage unit 540, and writes the decoded video data into the video buffer 560 in accordance with a time axis of a video.

The video buffer 560 cuts out the decoded video data in accordance with the overscan cutout region transmitted by the motion reduction processing unit 580. Center of the overscan cutout region is at the end of the quantity of motion indicated by a processed quantity of motion. The video buffer 560 then outputs the cut out video data to the video output unit 590.

The video output unit 590 outputs the video data output by the video buffer 560 to the display apparatus 200 via the HDMI 103. The display apparatus 200 displays the video based on the output video data (Step S707). By this processing, the quantity of motion is corrected based on the audio-visual environment information of the viewer, and accordingly the display apparatus 200 displays the video that is less likely to cause motion sickness.

Assume that a display size of the video is larger than a threshold value S2, brightness is higher than a threshold value L1 and lower than a threshold value L2, and a distance between a viewer and the display apparatus 200 is less than a threshold value D1. In this case, the correction amount of the reduction amount is calculated as follows: +30%+10%−10%=30%. Also, assume that a reference value of the vertical reduction amount is 60% and a reference value of the horizontal reduction amount is 40%. In this case, the vertical corrected reduction amount is 90% (60%+30%=90%), the horizontal corrected reduction amount is 70% (40%+30%=70%), and a processed quantity of motion is obtained as follows: a vertical component of the motion vector that defines a quantity of motion detected by the motion information detection unit 530 is multiplied by 0.9 and a horizontal component of the motion vector is multiplied by 0.7. With use of the processed quantity of motion as the quantity of motion, the decoded video is cut out in accordance with the overscan cutout region and output. In addition, the processed quantity of motion is never in an opposite direction from a direction indicated by the quantity of motion before the processing. That is, the reduction amount neither exceeds 100% nor becomes minus.

The above described is an operation from the acquisition of the reduction amount of the quantity of motion, through the video processing, to the output of the video.

Figure 8:
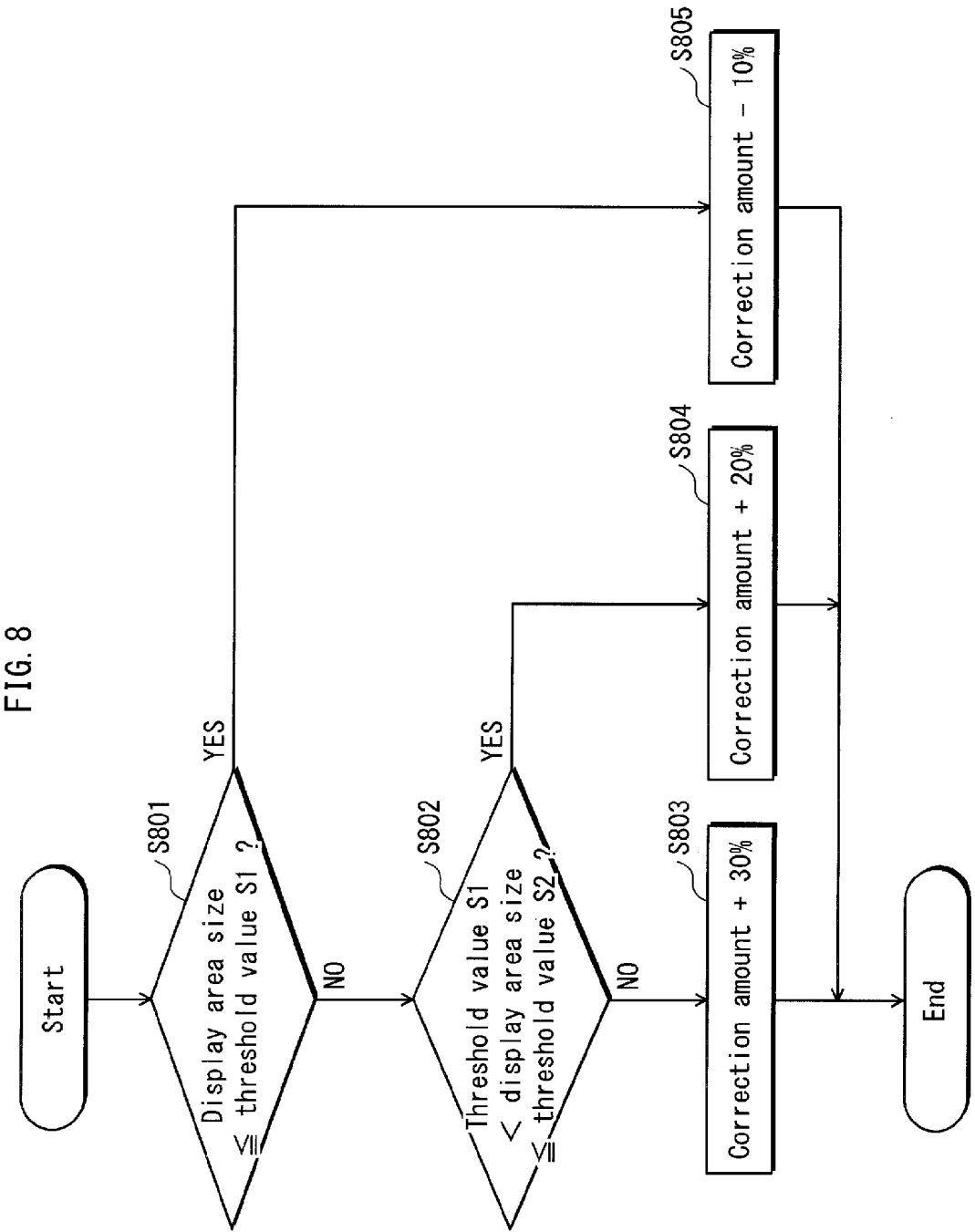
FIG. 8 is a flowchart calculating an adjustment amount of a reduction amount to reduce a quantity of motion of an image based on size of display area.

FIG. 8 is a flowchart for calculating the adjustment amount of the reduction amount for reducing the quantity of motion of the video based on the display area size, and shows a content of the processing performed in Step S703 above.

The reduction amount output unit 570 acquires the display area size information 521 from the audio-visual environment information storage unit 520. The reduction amount output unit 570 judges whether the display area size in accordance with the display area size information 521 is larger than a threshold value S1 (Step S801).

In the case where the display area size is smaller than the threshold value S1 (YES in Step S801), the reduction amount output unit 570 determines "−10%" for the correction amount based on the display area size (Step S801), and ends the process.

In the case where the display area size is larger than the threshold value S1 (NO in Step S801), the reduction amount output unit 570 then judges whether the display area size is smaller than the threshold value S2 (S2>S1) (Step S802).

In the case where the display area size is larger than the threshold value S1 and smaller than the threshold value S2 (YES in Step S802), the reduction amount output unit 570 determines "+20%" for the correction amount based on the display area size (Step S804), and ends the processing.

In the case where the display area size is larger than the threshold value S1 and not smaller than the threshold value S2, that is, the display area size is larger than S2 (NO in Step S802), the reduction amount output unit 570 determines "+30%" for the correction amount based on the display area size (Step S803), and ends the processing.

The above described is a specific content of the processing performed in Step S703 in the flowchart shown in FIG. 7. Additionally, in this flowchart, when the display area size is smaller than the threshold value S1, the correction amount is reduced (determined as −10%). Because in this case, a viewer is less likely to suffer from motion sickness, prevention of image deterioration due to a reduction of the quantity of motion takes priority. That is, there is a tradeoff between prevention of motion sickness and prevention of image deterioration. Accordingly such a processing is performed.

Figure 9:
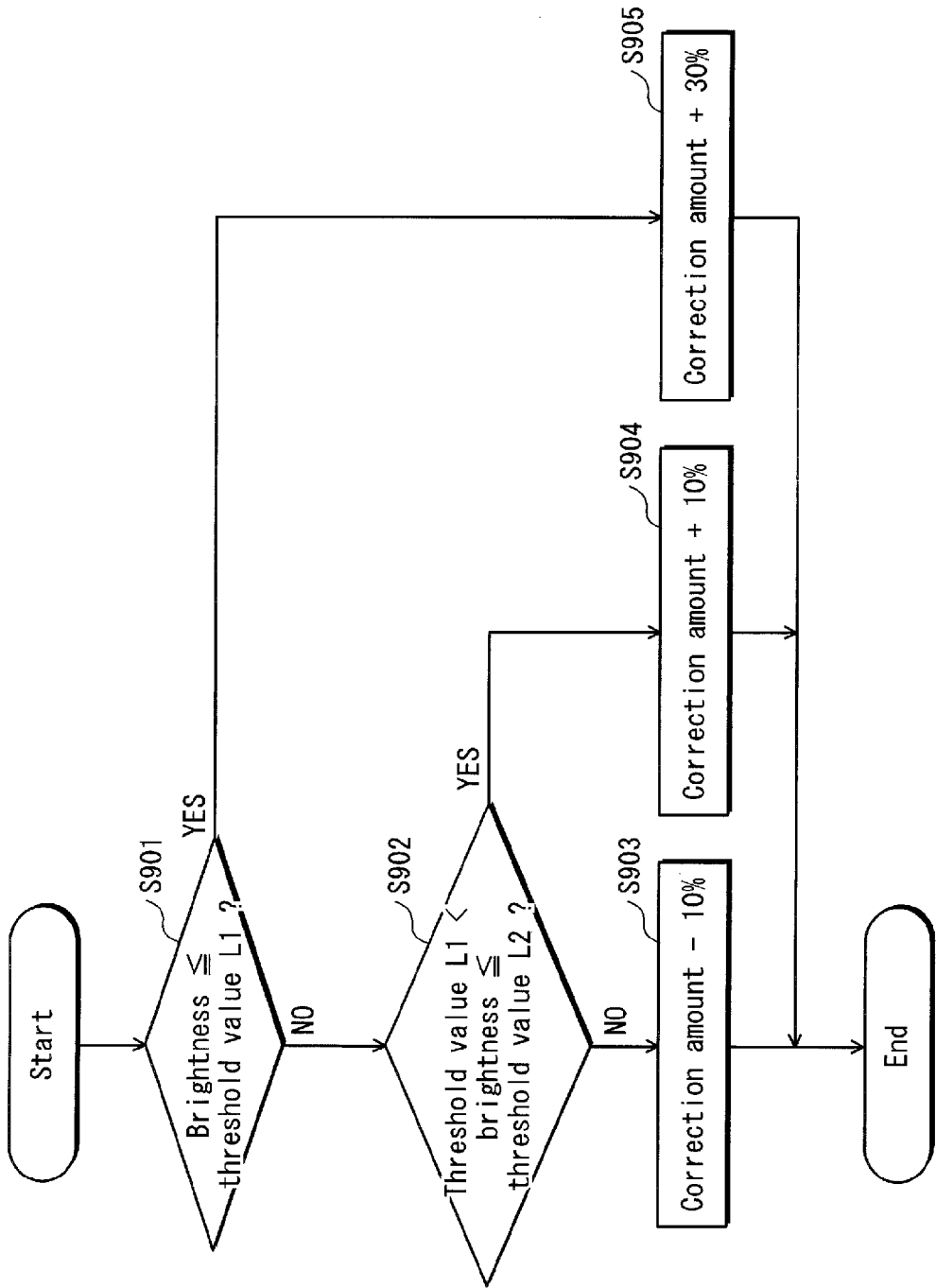
FIG. 9 is a flowchart calculating an adjustment amount of a reduction amount to reduce a quantity of motion of an image based on brightness.

FIG. 9 is a flowchart for calculating the adjustment amount of the reduction amount for reducing the quantity of motion of video based on brightness, and shows a content of the processing performed in Step S704 above.

The reduction amount output unit 570 acquires the brightness information 522 from the audio-visual environment information storage unit 520. The reduction amount output unit 570 judges whether brightness in accordance with the brightness information 521 is higher than the threshold value L1 (Step S901).

In the case where the brightness is lower than the threshold value L1 (YES in Step S901), the reduction amount output unit 570 determines "+30%" for the correction amount based on the brightness (Step S905), and ends the processing.

In the case where the brightness is higher than the threshold value L1 (NO in Step S901), the reduction amount output unit 570 then judges whether the brightness is lower than a threshold value L2 (L2>L1) (Step S902).

In the case where the brightness is higher than the threshold value L1 and lower than the threshold value L2 (YES in Step S902), the reduction amount output unit 570 determines "+10%" for the correction amount based on the brightness (Step S904), and ends the processing.

In the case where the brightness is higher than the threshold value L1 and not lower than the threshold value L2, that is, the brightness is higher than L2, (NO in Step L902), the reduction amount output unit 570 determines "−10%" for the correction amount based on the brightness (Step S903), and ends the processing.

The above described is a specific content of the processing in Step S704 in the flowchart shown in FIG. 7. Besides, the correction amount is reduced in Step S905 because of the same reason explained above in the case of FIG. 8.

Figure 10:
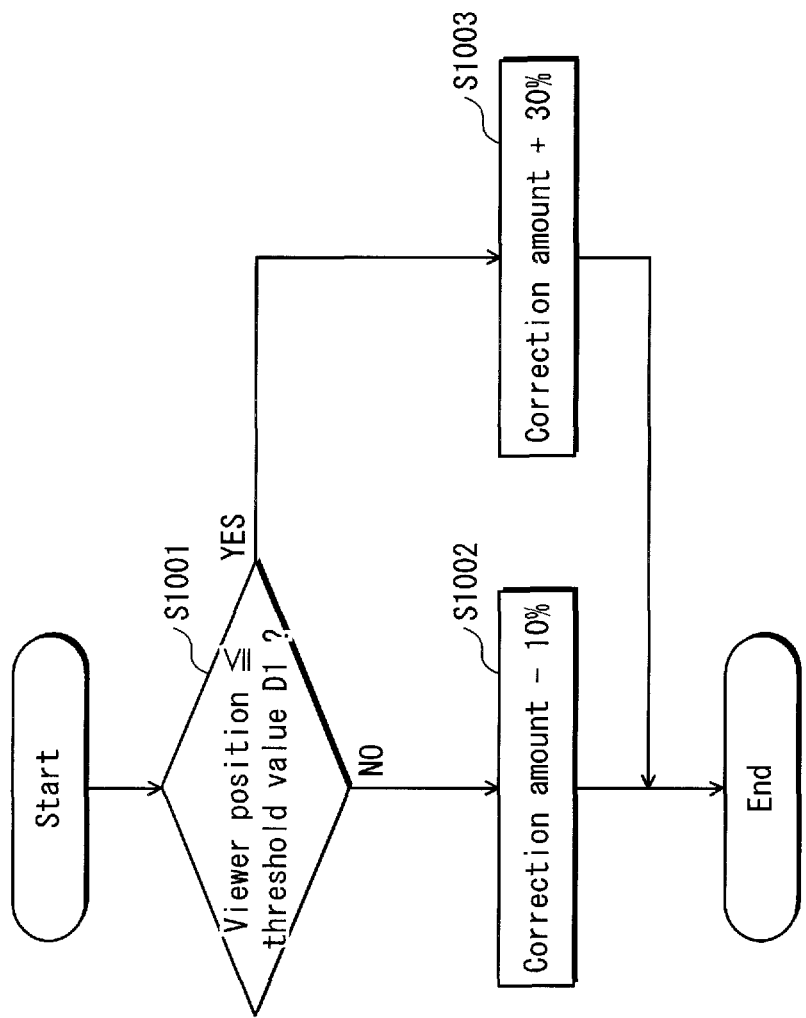
FIG. 10 is a flowchart calculating an adjustment amount of a reduction amount to reduce a quantity of motion of an image based on position of a viewer.

FIG. 10 is a flowchart for calculating the adjustment amount of the reduction amount for reducing the quantity of motion of video based on a distance between the viewer and the display apparatus 200, and shows a content of the processing in Step S705 above.

The reduction amount output unit 570 acquires the viewer position information 523 from the audio-visual environment information storage unit 520. The reduction amount output unit 570 judges whether the distance in accordance with the viewer position information 523 is longer than the threshold value D1 (Step S1001).

In the case where the distance is shorter than the threshold value D1 (YES in Step S1001), the reduction amount output unit 570 determines "+30%" for the correction amount based on the distance (Step S1001), and ends the processing.

In the case where the distance is longer than the threshold value D1 (NO in Step S1001), the reduction amount output unit 570 determines "−10%" for the correction amount based on the distance (Step S1002), and ends the processing.

The above described is a specific content of the processing in Step S705 in the flowchart shown in FIG. 7. Besides, the correction amount is reduced in Step S1002 because of the same reason explained above in the case of FIG. 8.

The video playback apparatus 100 determines a final adjusted reduction amount for adjusting the quantity of motion by adding the basic reduction amount to the correction amounts acquired by the processings in FIGS. 8-10. The playback apparatus 100 determines a cutout region based on the quantity of motion that has been reduced in accordance with the final adjusted reduction amount, cuts out the video in accordance with the cutout region, and outputs the cutout video to the display apparatus 200.

<Example of Motion Reduction Processing>

The following describes, with use of FIG. 11, an example of a case where the motion reduction processing unit 580 performs a motion reduction processing in accordance with flowcharts shown in FIGS. 7-10.

Regarding a decoded video 1100 that is decoded video data, the motion reduction processing unit 580 calculates a vertical component 1107 and a horizontal component 1109 of a motion vector 1106 that indicates the quantity of motion detected by the motion information detection unit 530.

The motion reduction processing unit 580 calculates a vertical component for reduction 1108 of the motion vector, by multiplying the calculated vertical component 1107 by a vertical reduction amount output by the reduction amount output unit 570.

In the same manner, the motion reduction processing unit 580 calculates a horizontal component for reduction 1110 of the motion vector, by multiplying the calculated horizontal component 1109 by the horizontal reduction amount output from the reduction amount output unit 570.

That is, a motion vector for reduction 1104 in FIG. 11 shows a quantity of motion that is to be reduced.

The motion reduction processing unit 580 performs an overscan processing by performing a cut-out processing (cut-out in accordance with an overscan cut-out region 1102) such that a position 1111 becomes a center. The position 1111 is shifted from a central position 1101 of the decoded video 1100 by a distance indicated by the motion vector for reduction 1104. By this shift, the original decoded video 1100 is moved in an opposite direction of the motion vector for reduction 1104, and then displayed. That is, the motion vector for reduction 1104 is reduced from the original motion vector 1106, and the motion of the decoded video 1100 is reduced. Besides, at this time, a magnification processing is also performed due to the overscan processing. However, the explanation of the magnification process is omitted since the magnification process is only a simple calculation and has been performed conventionally.

Also, in the case where the video is continuously moving in one direction, not only a simple processing for reducing a motion but also another processing is performed, for example, reducing a compensation amount of a start and an end of the motion, like a processing such as panning detection and tilting detection in blur correction.

As described above, the video is displayed after an overscan processing is performed based on the motion vector for reduction 1104. Therefore, motion sickness of the viewer can be reduced.

<Conclusion>

As described in the embodiment above, the playback apparatus 100 corrects and the video based on the audio-visual environment of the viewer that views the video acquired from the display apparatus 200, and plays back the corrected video. Therefore, the playback apparatus 100 can reduce motion sickness suffered by the viewer as much as possible, while image deterioration is being reduced to the necessary minimum. The correction can be made according to the environment of the viewer, and therefore it is possible to provide a playback apparatus that is more user-friendly than ever before.

A video imaged by a general user with use of a camera-integrated recording apparatus that is recordable with hi-vision resolution is likely to cause motion sickness compared to commercial contents for broadcast or distribution, since, for example, the user is not used to the camera and cannot image the video stably. Also, in recent years, a high-quality large flat screen television is becoming cheap, and accordingly more accessible. However, a viewer is likely to suffer from motion sickness when the viewer views a high-quality video on a large screen such as a flat screen television. The playback apparatus described in the embodiment is especially effective in the case where such a video imaged by the general user is viewed on the large screen.

<Supplementary>

While the present invention has been described with reference to the preferred embodiment, it is obviously understood that the present invention is not limited thereto. Hereinafter, various modifications will be explained. Such modifications are included in the present invention other than the embodiment described above.

(1) The above embodiment has been explained by giving examples such as the display area size information 521, the brightness information 522 and the viewer position information 523 as audio-visual environment information. However, the audio-visual environment information may be any information that indicates a viewer's audio-visual environment that relates to motion sickness, and the correction amount may be obtained with use of information other than the information described in the above embodiment.

For example, in the case of displaying different groups of videos, the quantity of motion of each group is different from one another. This makes a viewer likely to suffer from motion sickness. Therefore, while displaying the groups of the videos, the number of the groups may be used as the audio-visual environment information. Also, the correction amount may be determined depending on whether the number of the groups displayed on the display apparatus 200 is plural. That is, in the case of displaying the groups of the videos, the quantity of motion may be corrected by determining the correction amount of the reduction amount as, for example, "+20%", and in the case of displaying a single group of the video, the quantity of motion may be corrected by determining the correction amount of the reduction amount as, for example, "0". Naturally, the correction amount may be changed depending on threshold values that are based on the number of the groups of the videos.

Also, as the audio-visual environment information, information of brightness of irradiation by a light source of the display apparatus 200, that is so called a backlight, may be used for determining the correction amount. In such a case, preferably, the correction amount increases in proportion to a level of the irradiation by the backlight.

(2) According to the embodiment above, the video imaged by a movie camera that is the imaging apparatus 300 is written into the recording medium disc 400. After that, the video that have been stored in the disc is read, and played back after the quantity of motion is corrected. However, video data that is to be played back may not be read from the disc. The video data may be directly transmitted to the playback apparatus 100 from a HDD built in the imaging apparatus 300, by connecting directly the imaging apparatus 300 to the playback apparatus 100, with use of a USB cable, for example.

That is, any method may acquire a video that is to processed by the video processing apparatus according to the present invention. For example, video data may be acquired from streaming distribution.

(3) According to the embodiment above, when the correction amount of the motion reduction amount is determined, the final adjusted reduction amount is calculated by adding the basic reduction amount to the correction amount obtained from each of audio-visual environment information.

However, a method for calculating the adjusted reduction amount does not have to use a method described above. For example, the adjusted reduction amount may be obtained by multiplying the basic reduction amount by the correction amount obtained from each piece of audio-visual environment information. Besides, preferably, depending on each method, an appropriate correction amount is simulated and then determined.

(4) According to the embodiment above, the display apparatus 200 includes sensors 203. However, since the sensors 203 are provided so as to acquire information related to the audio-visual environment information of a viewer, the sensors 203 may be external equipments if the sensors can acquire the audio-visual environment information of the viewer. Also, the sensors may be included not in the display apparatus 200 but in the playback apparatus 100. In a usage pattern as FIG. 1 shows, even if the sensors 203 are included in the playback apparatus 100, the approximately same measurement result can be obtained when the sensors 203 are included in the display apparatus 200.

Also, the display apparatus 200 may be not a normal display but a projecting apparatus such as a projector. In such a case, the viewer position information indicates a distance from a projector to a screen. That is because a viewer views a video projected by the projector at a vicinity of the projector. Besides, in such a case, the viewer position information may be determined by measuring a distance from the projector to the screen with use of focusing accuracy of the projector, without including sensors.

Also, the display apparatus 200 may be a HMD (Head Mount Display). In such a case, a virtual distance calculated from a focal position in a virtual screen on the HMD may be used as the viewer position information. Also, some HMDs completely shut light of outside. The brightness information in such a case is determined with use of brightness of a part that does not display the video.

(5) According to the embodiment above, the sensors 203 included in the display apparatus 200 regularly output the brightness information or the viewer position information. However, if the playback apparatus 100 can acquire the audio-visual environment information, any configuration may be used. For example, the playback apparatus 100 may require the audio-visual environment information of the display apparatus 200, and the display apparatus 200 may transmit the audio-visual environment information to the playback apparatus based on the requirement.

(6) According to the embodiment above, threshold values for determining the correction amount of the motion reduction amount are stored beforehand in the playback apparatus 100. However, the number of these threshold values is not limited to the number of levels described in the embodiment above, and may be divided into any levels. For example, according to the embodiment above, two threshold values of the display area size are provided. However, the number of these values may be five or only one, for example.

Similarly, the correction amount of the motion reduction amount described in the embodiment above is one example. As FIGS. 8-10 show, the correction amount only has to be an amount for preventing motion sickness in accordance with the audio-visual environment information.

Also, without including threshold values, the playback apparatus may store therein a relational expression that defines each piece of audio-visual environment information and the correction amount with respect to a value indicated by each piece of audio-visual environment information, and the correction amount may be determined based on the relational expression. In such a case, the relational expression is as follows: the correction amount of the reduction amount increases in proportion to the display area size; the correction amount of the reduction amount increases in proportion to the brightness; and the correction amount of the reduction amount increases in inverse proportion to the distance between the viewer and the display apparatus.

Furthermore, the playback apparatus 100 may include a configuration for changing the correction amount according to a user input. For example, the playback apparatus 100 may have a configuration that provides a parameter for likelihood of motion sickness such that a viewer can set whether the viewer is likely to suffer from motion sickness. In such a configuration, in the case where a viewer who is likely to suffer from motion sickness views the video, the correction amount of the motion reduction amount may be large, and in the case where a viewer who is not likely to suffer from motion sickness views the video, the correction amount of the motion reduction amount may be small, compared to the case of the viewer who is likely to suffer from motion sickness.

(7) According to the embodiment above, the HDMI cable and its input/output terminal are described. However, they may be any cable that can be used for input/output of the video, and they may be cables such as a composite cable, an S terminal cable, a component cable and a D terminal cable and an input/output terminal corresponding to those cables.

Similarly, regarding a network connection, according to the embodiment above, connection with use of a LAN cable is described as an example. However, connection with use of an Ethernet terminal and its cable, connection such as a wireless LAN, Bluetooth or the like may be used.

(8) The CPU according to the embodiment above may be composed of one CPU or plural CPUs.

(9) According to the embodiment above, a LCD is described as one example of the display 204. However, the display 204 has only to display the video, and may be, for example, a PDP (Plasma Display Panel), a CRT (Cathode Ray Tube) display, an organic electroluminescence display and the like.

(10) According to the embodiment above, on the assumption that there is one viewer, a distance between the viewer and the display apparatus 200 is measured so as to be determined as the viewer position information. However, in reality, plural viewers sometimes view the video.

In such a case, the sensors 203 of the display apparatus 200 may use the viewer position information of a viewer who is nearest to the display apparatus 200. This is a measuring method that considers a problem that as a distance to the display grows shorter, the viewer is likely to suffer from motion sickness at a greater ratio.

Alternatively, the viewer position information may be an average value of acquired distances between each of plural viewers and the display apparatus.

(11) According to the embodiment above, the reduction amount in both directions, that is a vertical direction and a horizontal direction, is determined with use of only one reference. However, adjusted reduction amounts in the vertical direction and in the horizontal direction may be separately determined, by using different flows for determining the reduction amount, such that the vertical correction amount differs from the horizontal correction amount.

That is, regarding the correction amount in each of flowcharts shown in FIGS. 8-10, the vertical correction amount may differ from the horizontal correction amount. In such a case, considering that blurring in the vertical direction affects motion sickness suffered from a viewer more than blurring in the horizontal direction does, the vertical correction amount is preferably determined so as to be larger than the horizontal correction amount.

For example, if FIG. 8 shows a flowchart for determining the horizontal correction amount, in another flowchart for determining the vertical correction amount, the correction amount in Step S803 shown in FIG. 8 may be "+50%", and the correction amount in Step S804 may be "+30%".

Besides, in the case of a correction for reducing the reduction amount, that is, in Step S805 in FIG. 8, the vertical correction amount and the horizontal correction amount may be the same.

(12) According to the embodiment above, the acquisition unit 510 successively acquires the audio-visual environment information. However, for example, in the case of viewing a stationary digital television, on the assumption that the audio-visual environment will not change largely, the acquisition unit 510 may acquire the audio-visual environment information only once immediately before playing back the video, and may not successively acquire the audio-visual environment information while the video is being played back.

(13) According to the embodiment above, the video processing shown in FIG. 7 is successively performed while the video is being played back. However, if the audio-visual environment of a viewer does not change, all of the video data that is to be played back may be processed before being played back, processed video data may be stored, and then the video may be played back.

(14) The video processing unit 500 according to the embodiment above may include some or all of function sections except for the video processing unit 500 in FIG. 5. The configuration may be realized by one dedicated circuit or an integrated circuit.

(15) According to the embodiment above, the playback apparatus 100 or the imaging apparatus 300 includes the drive 105, and reads or writes the video data from the recording medium disc 400. However, the drive has only to read a recording medium that stores therein the video data, and write the data into the recording medium. Also, the recording medium may not be limited to a disc.

For example, in place of the drive, a USB memory interface may be used, and the recording medium disc may be a USB flash memory. Also, in place of the drive, a card reader writer may be used, and the recording medium disc may be an SD memory card.

In addition, the playback apparatus 100 or the imaging apparatus 300 may include not only one but a plurality of such interfaces for accessing the recording medium.

(16) According to the embodiment above, the video processing unit performs a reduction processing by a software processing, due to program execution by the CPU.

However, each function section in the video processing unit may be realized by a dedicated circuit that performs operations shown in the flowcharts in FIGS. 7-10. The dedicated circuit may be integrated.

Similarly, each function section of the playback apparatus 100, the display apparatus 200 and the imaging apparatus 300 may be integrated and realized by one or plural LSI (Large Scale Integration). Also, plural function sections may be realized by one LSI.

Note that although an LSI is used here, the circuit may be variously described as an IC (Integrated Circuit), a system LSI, a VLSI (Very Large Scale Integration), a SLSI (Super Large Scale Integration) or an ULSI (Ultra Large Scale Integration) depending on the level of integration.

Note also that the technique used for the integration does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are reconfigurable may also be used.

Moreover, if, due to progress in the field of semiconductor technology or the derivation of another technology, a technology to replace LSI emerges, such a technology may be used to integrate the functional blocks. The use of biotechnology or the like is considered to be a possibility.

(17) A control program composed of program code for making a processor such as a video playback apparatus or the like, and various circuits connected to the processor perform operations according to the preferred embodiment (see FIGS. 7-10), a video processing or the like may be recorded on a recording medium or distributed via various communication path (for example, telecommunications networks, wireless or wired network, and network represented by internet). The recording medium may be an IC card, a hard disc, an optical disc, a flexible disc, a ROM (read only memory), or the like. The distributed control program may be provided for use by being stored in a memory or the like that is readable by a processor in an apparatus, and the functions of the mobile communication terminal described in the preferred embodiment may be realized by the processor executing the control program.

INDUSTRIAL APPLICABILITY

The playback apparatus of the present invention can be used as an apparatus that is not likely to cause motion sickness while playing back a video imaged with use of a digital video camera or the like. The playback apparatus of the present invention can be used for an optical disc player such as a DVD player, a BD player, or a digital camera or the like.

REFERENCE SIGNS LIST 100 playback apparatus
101 CPU (Central Processing Unit)
102 memory
103 HDMI (High-Definition Multimedia Interface)
104 network communication unit
105 disc drive
106 decoder 107 video processor
108 internal bus
200 display apparatus
201 CPU
202 memory
203 sensor
204 display
205 HDMI
206 network communication unit
207 internal bus
300 imaging apparatus
301 CPU
302 memory
303 acceleration sensor
304 drive
305 decoder
306 encoder
307 camera unit
308 internal bus
400 recording medium disc
500 video processing unit
510 acquisition unit
520 audio-visual environment information storage unit
521 display area size information
522 brightness information
523 viewer position information
530 motion information detection unit
540 storage unit
550 video playback unit
560 video buffer
570 reduction amount output unit
580 motion reduction processing unit
590 video output unit
600 video processing unit
610 imaging unit
620 blur reducing unit
630 blur information detection unit
640 video buffer
650 video coding unit
660 reduced blur information recording unit
670 video recording unit
680 blur information recording unit
690 storage unit

The invention claimed is:

1. A video processing apparatus that processes a video and outputs the processed video for playback, the video processing apparatus comprising:
a motion information acquisition unit operable to acquire motion information related to a motion between two or more frames constituting the video and operable to determine a quantity of motion based on the acquired motion information, the quantity of motion being information composed of a horizontal component and a vertical component and indicating a difference between a display position of a specific region in one of the two or more frames and a display position of the specific region in another of the two or more frames;
an audio-visual environment information acquisition unit operable to acquire audio-visual environment information indicating an audio-visual environment of a viewer that views the processed video;
a reduction amount output unit operable to output, based on the audio-visual environment information acquired by the audio-visual environment information acquisition unit, a reduction rate for reducing the quantity of motion that is determined by the motion information acquisition unit as a reduction amount; and
a processing unit operable to process the video by performing a correction to reduce the quantity of motion of the video using the reduction amount output by the reduction amount output unit, wherein
the reduction amount output unit
(i) obtains, as a basic reduction amount, a horizontal basic reduction rate and a vertical basic reduction rate indicating a greater rate of reduction than the horizontal basic reduction rate, the horizontal basic reduction rate and the vertical basic reduction rate being determined in advance,
(ii) adjusts the basic reduction amount by adding a correction value that is based on the audio-visual environment information to each of the horizontal basic reduction rate and the vertical basic reduction rate, thereby obtaining a horizontal adjusted reduction rate and a vertical adjusted reduction rate, respectively, and
(iii) outputs, as the reduction amount, the horizontal adjusted reduction rate and the vertical adjusted reduction rate, the horizontal adjusted reduction rate and the vertical adjusted reduction rate being for reducing the horizontal component and the vertical component of the quantity of motion, respectively, the vertical adjusted reduction rate being greater than the horizontal adjusted reduction rate.

2. The video processing apparatus of claim 1, wherein
the audio-visual environment information includes size information indicating a size of a video display area of a display apparatus that is to play back the processed video, and
the reduction amount output unit adjusts the basic reduction amount based on the size information.

3. The video processing apparatus of claim 2, wherein
when the size of the video display area indicated by the size information is larger than a predetermined size, the reduction amount output unit performs the adjustment by increasing the basic reduction amount.

4. The video processing apparatus of claim 2, wherein
the reduction amount output unit performs the adjustment by increasing the basic reduction amount in proportion to the size of the video display area indicated by the size information.

5. The video processing apparatus of claim 2, wherein
the reduction amount output unit performs the adjustment such that as the size of the video display area indicated by the size information grows larger, the vertical component of the quantity of motion increases at a greater ratio than the horizontal component of the quantity of motion.

6. The video processing apparatus of claim 1, wherein
the audio-visual environment information includes brightness information indicating a brightness around a display apparatus that is to play back the processed video, and
the reduction amount output unit adjusts the basic reduction amount based on the brightness information.

7. The video processing apparatus of claim 6, wherein
when the brightness indicated by the brightness information is lower than a brightness indicated by a predetermined threshold value, the reduction amount output unit performs the adjustment by increasing the basic reduction amount.

8. The video processing apparatus of claim 6, wherein
the reduction amount output unit performs the adjustment by increasing the basic reduction amount in inverse proportion to the brightness indicated by the brightness information.

9. The video processing apparatus of claim 1, wherein
the audio-visual environment information includes viewer position information indicating a distance between the viewer that views the processed video and a display apparatus that is to play back the processed video, and
the reduction amount output unit performs the adjustment based on the viewer position information.

10. The video processing apparatus of claim 9, wherein
when the distance indicated by the viewer position information is shorter than a distance indicated by a predetermined threshold value, the reduction amount output unit performs the adjustment by increasing the basic reduction amount.

11. The video processing apparatus of claim 10, wherein
the reduction amount output unit performs the adjustment by increasing the basic reduction amount in inverse proportion to the distance indicated by the viewer position information.

12. The video processing apparatus of claim 10, wherein
the reduction amount output unit performs the adjustment such that as the distance indicated by the viewer position information grows shorter, the reduction amount of the vertical component of the quantity of motion increases at a greater ratio than the reduction amount of the horizontal component of the quantity of motion.

13. The video processing apparatus of claim 1, further comprising:
an output unit operable to, when the video that is stored in a recording medium is overscanned, cut out and output a cut-out region determined based on the quantity of motion that is reduced in accordance with the adjusted reduction amount.

14. The video processing apparatus of claim 1, wherein
in the processing of the video, the processing unit
calculates a vertical component of a quantity of motion for reduction by multiplying the vertical component of the quantity of motion determined by the motion information acquisition unit by the vertical adjusted reduction rate, and subtracts the calculated vertical component of the quantity of motion for reduction from the vertical component of the quantity of motion determined by the motion information acquisition unit, and
calculates a horizontal component of the quantity of motion for reduction by multiplying the horizontal component of the quantity of motion determined by the motion information acquisition unit by the horizontal adjusted reduction rate, and subtracts the calculated horizontal component of the quantity of motion for reduction from the horizontal component of the quantity of motion determined by the motion information acquisition unit.

15. A video processing method that processes a video played back by a video playback apparatus, the video processing method comprising:
acquiring motion information related to a motion between two or more frames constituting the video and determining a quantity of motion based on the acquired motion information, the quantity of motion being information composed of a horizontal component and a vertical component and indicating a difference between a display position of a specific region in one of the two or more frames and a display position of the specific region in another of the two or more frames;
acquiring audio-visual environment information indicating an audio-visual environment of a viewer that views the processed video;
outputting, based on the audio-visual environment information acquired by said acquiring of the audio-visual environment information, a reduction rate for reducing the quantity of motion that is determined by said acquiring of the motion information as a reduction amount; and
processing the video by performing a correction to reduce the quantity of motion of the video using the reduction amount output by said outputting of the reduction amount, wherein
said outputting further comprises
(i) obtaining, as a basic reduction amount, a horizontal basic reduction rate and a vertical basic reduction rate indicating a greater rate of reduction than the horizontal basic reduction rate, the horizontal basic reduction rate and the vertical basic reduction rate being determined in advance,
(ii) adjusting the basic reduction amount by adding a correction value that is based on the audio-visual environment information to each of the horizontal basic reduction rate and the vertical basic reduction rate, thereby obtaining a horizontal adjusted reduction rate and a vertical adjusted reduction rate, respectively, and
(iii) outputting, as the reduction amount, the horizontal adjusted reduction rate and the vertical adjusted reduction rate, the horizontal adjusted reduction rate and the vertical adjusted reduction rate being for reducing the horizontal component and the vertical component of the quantity of motion, respectively, the vertical adjusted reduction rate being greater than the horizontal adjusted reduction rate.

16. A video processing integrated circuit that processes a video and outputs the processed video for playback, the video processing integrated circuit comprising:
a motion information acquisition unit operable to acquire motion information related to a motion between two or more frames constituting the video, and operable to determine a quantity of motion based on the acquired motion information, the quantity of motion being information composed of a horizontal component and a vertical component and indicating a difference between a display position of a specific region in one of the two or more frames and a display position of the specific region in another of the two or more frames;
an audio-visual environment information acquisition unit operable to acquire audio-visual environment information indicating an audio-visual environment of a viewer that views the processed video;
a reduction amount output unit operable to output, based on the audio-visual environment information acquired by the audio-visual environment information acquisition unit, a reduction rate for reducing the quantity of motion that is determined by the motion information acquisition unit as a reduction amount; and
a processing unit operable to process the video by performing a correction to reduce the quantity of motion of the video using the reduction amount output by the reduction amount output unit, wherein
the reduction amount output unit
(i) obtains, as a basic reduction amount, a horizontal basic reduction rate and a vertical basic reduction rate indicating a greater rate of reduction than the horizontal basic reduction rate, the horizontal basic reduction rate and the vertical basic reduction rate being determined in advance, (ii) adjusts the basic reduction amount by adding a correction value that is based on the audio-visual environment information to each of the horizontal basic reduction rate and the vertical basic reduction rate, thereby obtaining a horizontal adjusted reduction rate and a vertical adjusted reduction rate, respectively, and (iii) outputs, as the reduction amount, the horizontal adjusted reduction rate and the vertical adjusted reduction rate, the horizontal adjusted reduction rate and the vertical adjusted reduction rate being for reducing the horizontal component and the vertical component of the quantity of motion, respectively, the vertical adjusted reduction rate being greater than the horizontal adjusted reduction rate.

17. A video playback apparatus that processes a video and outputs the processed video for playback, the video playback apparatus comprising:

a motion information acquisition unit operable to acquire motion information related to a motion between two or more frames constituting the video, and operable to determine a quantity of motion based on the acquired motion information, the quantity of motion being information composed of a horizontal component and a vertical component and indicating a difference between a display position of a specific region in one of the two or more frames and a display position of the specific region in another of the two or more frames;

an audio-visual environment information acquisition unit operable to acquire audio-visual environment information indicating an audio-visual environment of a viewer that views the processed video;

a reduction amount output unit operable to output, based on the audio-visual environment information acquired by the audio-visual environment information acquisition unit, a reduction rate for reducing the quantity of motion that is determined by the motion information acquisition unit as a reduction amount; and a processing unit operable to process the video by performing a correction to reduce the quantity of motion of the video using the reduction amount output by the reduction amount output unit, wherein the reduction amount output unit (i) obtains, as a basic reduction amount, a horizontal basic reduction rate and a vertical basic reduction rate indicating a greater rate of reduction than the horizontal basic reduction rate, the horizontal basic reduction rate and the vertical basic reduction rate being determined in advance, (ii) adjusts the basic reduction amount by adding a correction value that is based on the audio-visual environment information to each of the horizontal basic reduction rate and the vertical basic reduction rate, thereby obtaining a horizontal adjusted reduction rate and a vertical adjusted reduction rate, respectively, and (iii) outputs, as the reduction amount, the horizontal adjusted reduction rate and the vertical adjusted reduction rate, the horizontal adjusted reduction rate and the vertical adjusted reduction rate being for reducing the horizontal component and the vertical component of the quantity of motion, respectively, the vertical adjusted reduction rate being greater than the horizontal adjusted reduction rate.

* * * * *